(12) United States Patent
Kalika et al.

(10) Patent No.: US 12,126,057 B2
(45) Date of Patent: Oct. 22, 2024

(54) SEALED POROUS STRUCTURES FOR SOLID OXIDE FUEL CELLS AND METHODS OF FABRICATING THEREOF

(71) Applicant: Proof Energy Inc., Fremont, CA (US)

(72) Inventors: Vlad Kalika, Ladera Ranch, CA (US); Steven Couse, Apex, NC (US); Timothy G. Dummer, Lafayette, CA (US)

(73) Assignee: Proof Energy Inc., Fremont, CA (US)

( * ) Notice: Subject to any disclaimer, the term of this patent is extended or adjusted under 35 U.S.C. 154(b) by 5 days.

(21) Appl. No.: 17/514,587

(22) Filed: Oct. 29, 2021

(65) Prior Publication Data

US 2023/0132773 A1    May 4, 2023

(51) Int. Cl.
*H01M 8/0228* (2016.01)
*H01M 8/021* (2016.01)
*H01M 8/0232* (2016.01)
*H01M 8/0245* (2016.01)
*H01M 8/0276* (2016.01)
(Continued)

(52) U.S. Cl.
CPC ......... *H01M 8/0228* (2013.01); *H01M 8/021* (2013.01); *H01M 8/0232* (2013.01); *H01M 8/0245* (2013.01); *H01M 8/0276* (2013.01); *H01M 8/0282* (2013.01); *H01M 8/0286* (2013.01); *H01M 2008/1293* (2013.01)

(58) Field of Classification Search
CPC .................................................. H01M 8/0286
See application file for complete search history.

(56) References Cited

U.S. PATENT DOCUMENTS 6,846,511 B2    1/2005  Visco et al.
6,979,511 B2    12/2005 Visco et al.
(Continued)

FOREIGN PATENT DOCUMENTS

DE    102017106491 A1 * 9/2018 ......... H01M 8/0273
KR    1020140092749 A    7/2014

OTHER PUBLICATIONS

International Application Serial No. PCT/US2022/078824, Search Report and Written Opinion mailed Jun. 22, 2023.

*Primary Examiner* — Brian R Ohara
(74) *Attorney, Agent, or Firm* — Polygon IP, LLP

(57) ABSTRACT

Described herein are solid oxide fuel cells (SOFCs), comprising anode-conductor seals and/or cathode-conductor seals used for sealing porous metal structures and controlling the distribution of fuel and oxidants within these porous structures. For example, a SOFC comprises an anode conductor, cathode conductor, and electrolyte, disposed between the anode and cathode conductors. The anode conductor comprises multiple porous portions (permeable to the fuel) and a non-porous portion. The SOFC also comprises an anode-conductor seal, forming a stack with the non-porous portion. This sealing stack extends between the electrolyte and current collector and separates two porous portions thereby preventing the fuel and oxidant migration between these portions. In some examples, the sealing stack forms an enclosed boundary around one porous portion of the anode conductor. In the same or other examples, another sealing stack is formed in the cathode conductor, e.g., surrounding a fuel port extending through the cathode conductor.

20 Claims, 8 Drawing Sheets

(51) Int. Cl.
    *H01M 8/0282*     (2016.01)
    *H01M 8/0286*     (2016.01)
    *H01M 8/12*     (2016.01)

(56) References Cited

U.S. PATENT DOCUMENTS

| | | |
|---|---|---|
| 7,351,488 B2 | 4/2008 | Visco et al. |
| 7,553,573 B2 | 6/2009 | Visco et al. |
| 8,283,077 B1 | 10/2012 | Visco et al. |
| 2002/0048699 A1 | 4/2002 | Steele et al. |
| 2009/0061279 A1* | 3/2009 | Larsen ................ H01M 8/1226 429/410 |
| 2010/0062317 A1 | 3/2010 | Selcuk |
| 2010/0143824 A1 | 6/2010 | Tucker et al. |
| 2012/0205042 A1* | 8/2012 | Erikstrup ............... H01M 8/023 156/60 |
| 2016/0260986 A1 | 9/2016 | Devoe et al. |
| 2018/0323443 A1 | 11/2018 | Tucker et al. |
| 2020/0358122 A1 | 11/2020 | Tucker et al. |

\* cited by examiner

SEALED POROUS STRUCTURES FOR SOLID OXIDE FUEL CELLS AND METHODS OF FABRICATING THEREOF

BACKGROUND

Solid oxide fuel cells (SOFCs) are used for various applications, e.g., auxiliary power units in electrical vehicles, stationary power generators, and the like. Similar to other fuel cells and unlike conventional heat engines, SOFCs are modular, scalable, efficient, and clean. Unlike internal combustion engines, SOFCs produce zero emissions. Furthermore, SOFCs can use a wide range of fuels and are generally more tolerant to various fuel contaminants than other types of fuel cells. SOFCs also produce high-temperature exhaust that can be used, for example, to power heaters and turbines. Finally, SOFCs can provide carbon capture opportunities due to the separation of fuel and oxidant streams in these cells.

Metal-supported SOFCs represent the latest development in the fuel cell field. A metal-supported cell is rugged, vibration tolerant, and thermal-shock tolerant that enables rapid startup capability. A metal-supported SOFC typically utilizes porous metal layers for transferring the fuel and oxidant to the electrolyte, positioned in between these porous metal layers. For example, the fuel and oxidant can be supplied through the supply ports extending through multiple SOFCs forming one assembly, which can be referred to internally manifolded cell/stack design. The fuel and oxidant independently flow through each porous metal layer to different portions of the electrolyte and away from their respective supply ports. However, porous cell structure can also result in direct intermixing of the fuel and oxidant if the distribution is not controlled. For example, each porous metal layer (i.e., on each side of the electrode) can extend to both fuel and oxidant supply ports.

What is needed are new SOFCs with controlled distribution of fuels and oxidants within porous metal layers of these cells.

SUMMARY

Described herein are solid oxide fuel cells (SOFCs), comprising anode-conductor seals and/or cathode-conductor seals used for sealing porous metal structures and controlling the distribution of fuel and oxidants within these porous structures. For example, a SOFC comprises an anode conductor, cathode conductor, and electrolyte, disposed between the anode and cathode conductors. The anode conductor comprises multiple porous portions (permeable to the fuel) and a non-porous portion. The SOFC also comprises an anode-conductor seal, forming a stack with the non-porous portion. This sealing stack extends between the electrolyte and current collector and separates two porous portions thereby preventing the fuel and oxidant migration between these portions. In some examples, the sealing stack forms an enclosed boundary around one porous portion of the anode conductor. In the same or other examples, another sealing stack is formed in the cathode conductor, e.g., surrounding a fuel port extending through the cathode conductor.

In some examples, a SOFC for electrochemically reacting fuel and oxidant and producing an electrical current is provided. The SOFC comprises an anode conductor, comprising anode-conductor porous portions and an anode-conductor non-porous portion. Each of the anode-conductor porous portions is permeable to the fuel. The SOFC also comprises an anode-conductor seal. The anode-conductor non-porous portion and the anode-conductor seal form a stack, impermeable to the fuel and forming an anode-conductor boundary around one of the anode-conductor porous portions. Furthermore, the SOFC comprises a cathode conductor, comprising a cathode-conductor porous portion permeable to the oxidant, and an electrolyte, disposed between the anode conductor and cathode conductor. The electrolyte is fluidically and electrically coupled to each of the anode conductor and the cathode conductor. Furthermore, the electrolyte is configured to electrochemically react the fuel and the oxidant to produce the electrical current between the anode conductor and cathode conductor.

In some examples, the anode-conductor non-porous portion is monolithic with the anode-conductor porous portions. In more specific examples, the anode-conductor non-porous portion and the anode-conductor porous portions are both formed stainless steel. The anode-conductor non-porous portion may have a porosity of less than 10%. In some examples, the anode-conductor non-porous portion is formed by compression or melting of the anode-conductor porous portions.

In some examples, the anode-conductor seal is formed from one or more materials selected glass or braze. In the same or other examples, the anode conductor comprises an anode-conductor first side and an anode-conductor second side, opposite of the anode-conductor first side and directly interfacing the electrolyte. A portion of the anode-conductor seal extends over a part of the anode-conductor first side. The height of the anode-conductor seal can be greater than the height of the anode-conductor non-porous portion in the stack. In some examples, the anode-conductor non-porous portion extends to and directly interfaces the electrolyte.

In some examples, the SOFC, or more generally, the SOFC stack comprises interconnecting plates. At least a part of the anode-conductor porous portions of the anode conductor directly interfaces and is electrically coupled to the first one of the interconnecting plates. At least a part of the cathode-conductor porous portions of the cathode conductor directly interfaces and is electrically coupled to the second one of the interconnecting plates. The anode-conductor seal extends to and is sealed against the first one of the interconnecting plates. In some examples, at least a part of the anode-conductor seal extends between the first one of the interconnecting plates and the anode-conductor porous portions.

In some examples, the SOFC further comprises a cathode-conductor seal. The cathode conductor further comprises a cathode-conductor non-porous portion. The cathode-conductor non-porous portion and the cathode-conductor seal form a cathode-conductor sealing stack impermeable to the fuel and forming a cathode-conductor boundary around at least a part of the cathode-conductor porous portion. In some examples, the cathode-conductor seal is laterally offset relative to the anode-conductor seal. The cathode-conductor boundary can be surrounded by the anode-conductor boundary. In some examples, the cathode-conductor boundary surrounds a fuel port, protruding through the SOFC.

Also provided is a method of forming a SOFC. In some examples, the method comprises providing a subassembly comprising an anode-conductor porous portion, a cathode-conductor porous portion, and an electrolyte disposed between the anode-conductor porous portion and the cathode-conductor porous portion. The method continues with forming an anode-conductor non-porous portion from a part of the anode-conductor porous portion, wherein forming the anode-conductor non-porous portion also forms an anode-conductor cavity. In some examples, the method also comprises forming an anode-conductor seal within the anode-conductor cavity. For example, forming the anode-conductor non-porous portion can comprise one or more techniques selected from the group (1) selective mechanical compression of the part of the anode-conductor porous portion, and (2) selective melting of the part of the anode-conductor porous portion.

In some examples, selective melting of the part of the anode-conductor porous portion is performed using a laser.

In some examples, forming the anode-conductor seal comprises filling the anode-conductor cavity with a seal-precursor material and melting the seal-precursor material within the anode-conductor cavity.

In some examples, the method further comprises forming a cathode-conductor non-porous portion from a part of the cathode-conductor porous portion. This operation also forms a cathode-conductor cavity. The method also comprises forming a cathode-conductor seal within the cathode-conductor cavity.

These and other embodiments are described further below with reference to the figures.

DETAILED DESCRIPTION

Figure 1A:
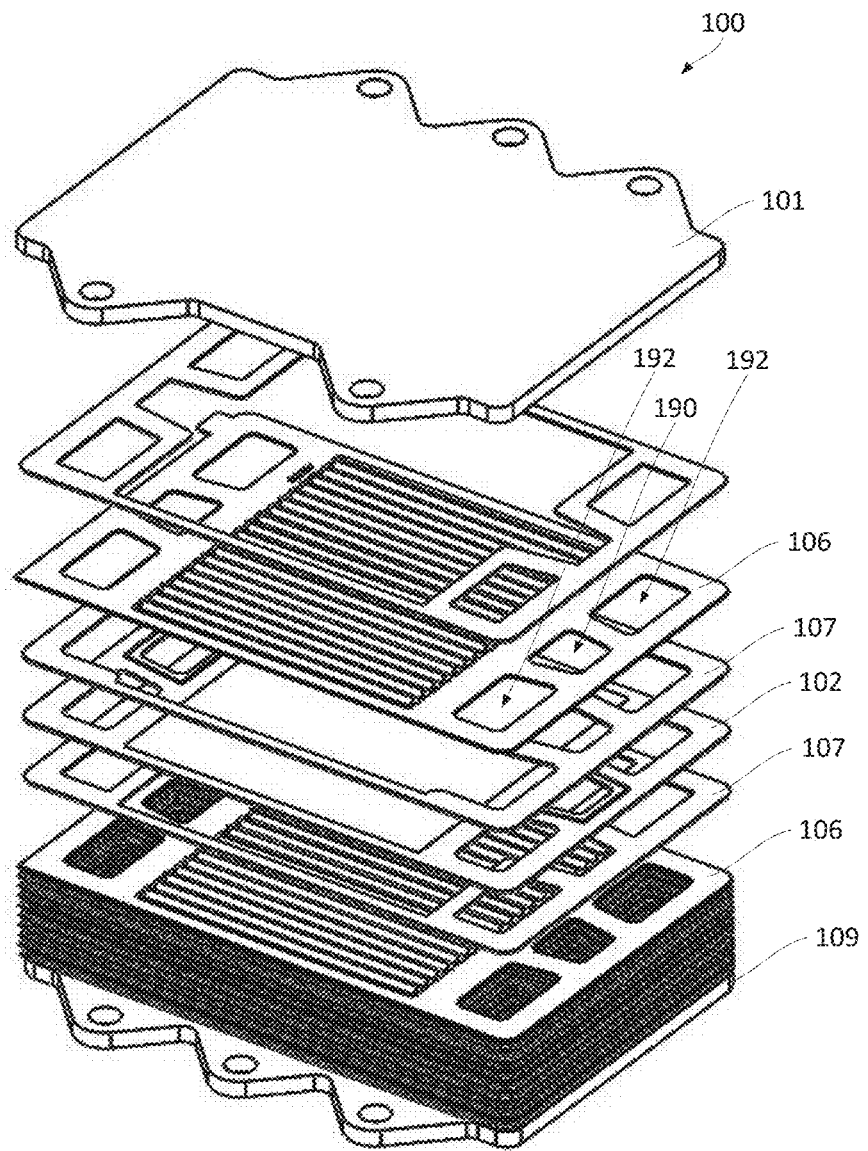
FIG. 1A is a schematic exploded view of a SOFC assembly, illustrating various components of this assembly, in accordance with some examples.

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

Introduction

A metal-supported SOFC utilizes porous metal layers for fuel and oxidant delivery to the electrolyte. The electrolyte comprises an anode layer, a cathode layer, and an electrolyte layer, disposed between the anode and cathode layers. The anode and cathode layers comprise catalysts, enabling the electrochemical reaction to produce electrical current. The electrolyte layer transmits ions between the anode and cathode layers thereby balancing the electrical current. In addition to delivering the fuel and oxidant, the porous metal layers are also responsible for conducting this electrical current between the electrolyte and interconnecting plates. The porous metal layers can be referred to as an anode conductor and cathode conductor. Specifically, the anode conductor directly interfaces as well as fluidically and electronically coupled to the anode layer of the electrolyte. The anode conductor is responsible for fuel delivery to the anode layer. The cathode conductor directly interfaces as well as fluidically and electronically coupled to the cathode layer of the electrolyte. The cathode conductor is responsible for oxidant delivery to the cathode layer.

Uniform delivery of the fuel and oxidant as well as uniform distribution of the fuel and oxidant at the responsive layers is beneficial for the cell performance and allows for efficient utilization of the entire surface of the electrolyte. At the same time, direct mixing of the fuel and oxidant is not desirable. Considering the porous structure of the anode and anode conductors, controlled distribution can be challenging. Porous structures are specifically used to enable the fuel and oxidant flow through these structures. However, the same porous structure is exposed to both fuel and oxidant (e.g., bypassing both fuel and oxidant ports through this structure), fuel-oxidant mixing is possible if the distribution is not specifically controlled.

SOFCs described herein include anode-conductor seals and/or cathode-conductor seals to eliminate the fuel-oxidant mixing. Specifically, an anode-conductor seal forms a sealing stack together with a non-porous portion of the anode-conductor. This non-porous portion can be formed by selective mechanical compression and/or selective melting of the initial porous structure. The remaining parts of this initial porous structure, which are not compressed or melted, remain porous and can be referred to as anode-conductor porous portions. Therefore, the sealing stack extends between two adjacent porous portions and prevents fuel and/or oxidant transfer between these porous portions. Sealing of the cathode conductor can be performed similarly.

FIG. 1A is a schematic exploded view of one example of SOFC assembly 100, illustrating various components of this assembly. Specifically, SOFC assembly 100 comprises one or more SOFCs 102. Each SOFC 102 is positioned between two interconnecting plates 106, collectively forming SOFC stack 104. It should be noted that, when stacked, two adjacent SOFC stacks 104 share interconnecting plate 106. In other words, interconnecting plate 106 is positioned between and interconnects two SOFCs 102. In this example, all SOFCs 102 in SOFC assembly 100 are connected in series.

In some examples, SOFC assembly 100 comprises flow plates 107, used for spacing other components and providing pathways for fuel and oxygen to SOFCs 102. Flow plates 107 can be standalone components or be integrated with interconnecting plate 106. It should be noted that away from the edge, interconnecting plate 106 and SOFCs 102 directly contact each other and are electrically interconnected. It should be noted that SOFCs 102 can protrude to and form a portion of the sides of SOFC assembly 100. In other words, at least the edges of SOFCs 102 can be exposed to the environment. It should be also noted that each SOFC 102 comprises porous metal layers forming opposite sides of this SOFC 102 as further described below with reference to FIGS. 2A-2C. Finally, SOFCs 102 and interconnecting plates 106 can be stacked between first end-plate current-collector 101 and second end-plate current-collector 109, defining the top-bottom boundaries of SOFC assembly 100. First end-plate current-collector 101 and second end-plate current-collector 109 can be electrically coupled to an external electrical load, which SOFC assembly 100 powers.

Figure 1B:
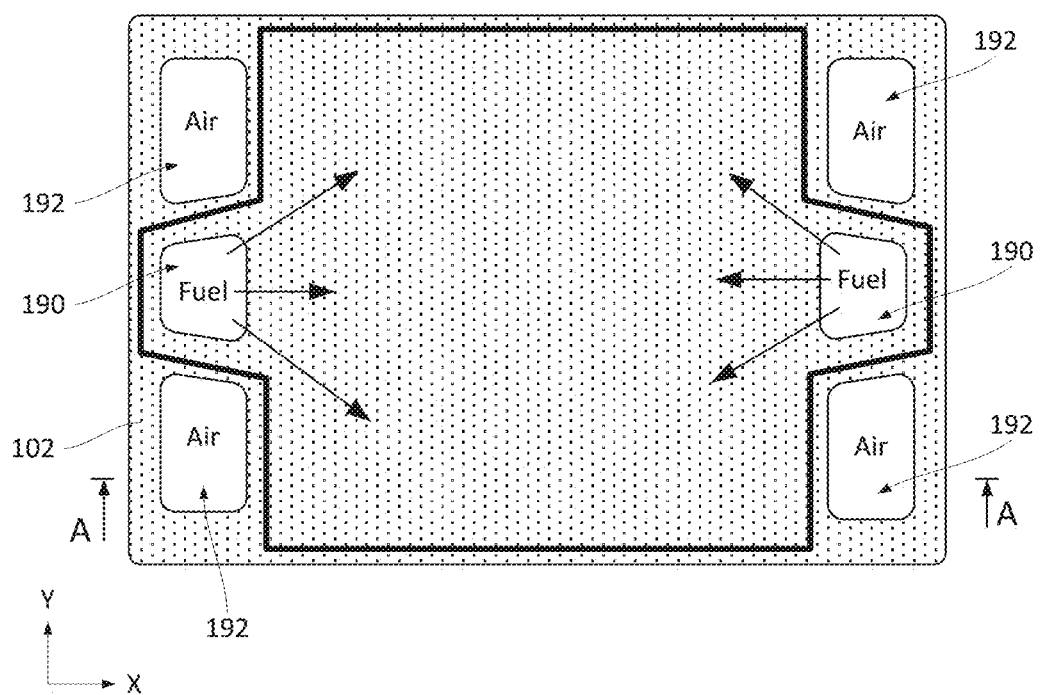
FIG. 1B is a top schematic view of the SOFC in the SOFC assembly (in FIG. 1A) further illustrating fuel and oxidant ports protruding through this SOFC, in accordance with some examples.

Referring to FIGS. 1A and 1B, in some examples, SOFC assembly 100 also comprises one or more fuel ports 190 and one or more oxidant ports 192 for supplying fuel and oxidant to each SOFC 102. In this example, SOFC assembly 100 comprises two fuel ports 190 (positioned along the shorter sides) and four oxidant ports 192 (positioned in the corners). However, any number of ports and any positions of these ports are within the scope. Fuel ports 190 and oxidant ports 192 protrude through the entire stack, e.g., each SOFC 102 and interconnecting plate 106. FIG. 16 illustrates the position of fuel ports 190 and oxidant ports 192 in SOFC 102. It should be noted that each side of each SOFC 102 (formed by porous metal layers) can be exposed to both fuel and oxidant (e.g., extend to one or more fuel ports 190 and one or more oxidant ports 192). Without controlled distribution of the fuel and oxidant within SOFC 102, direct mixing of the fuel and oxidant can occur. The controlled distribution will now be described with reference to FIGS. 2A and 2B, roughly representing the "A-A" cross-section identified in FIG. 16.

Figure 2A:
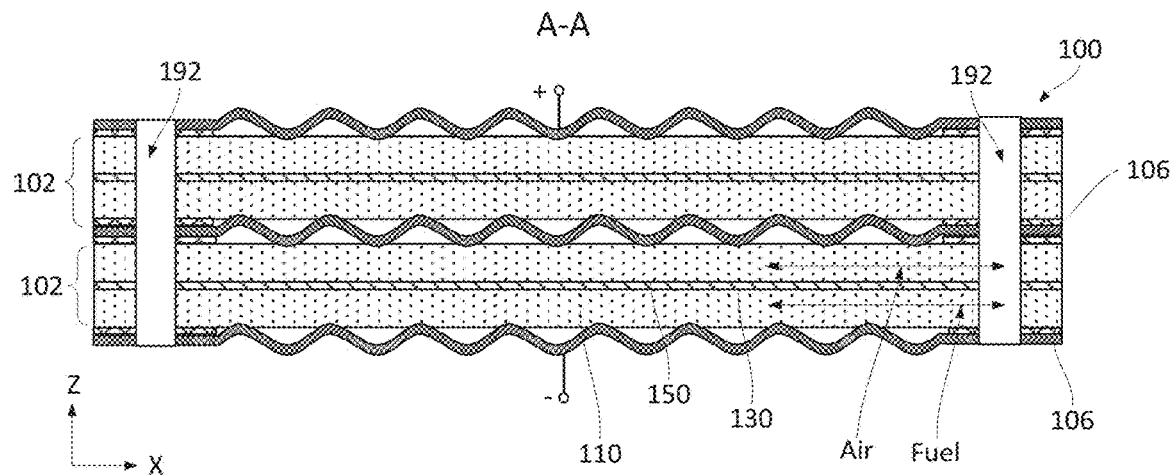
FIGS. 2A and 2B are schematic cross-sectional views of two examples of a SOFC assembly, illustrating various internal components.
Figure 2B:
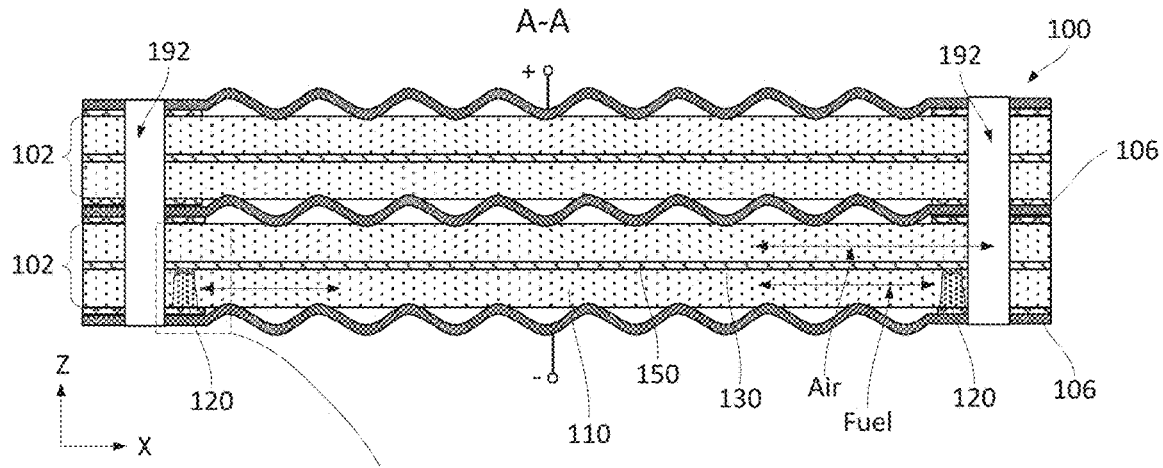

Specifically, FIGS. 2A and 2B illustrate two examples of SOFC assembly 100. In these examples, SOFC assembly 100 comprises two SOFCs 102. However, one having ordinary skill in the art would understand that any number of SOFCs 102 can form SOFC assembly 100, e.g., one, two, three, four, or more. Each SOFC 102 comprises anode conductor 110, cathode conductor 150, and electrolyte 130 disposed between anode conductor 110 and cathode conductor 150. Electrolyte 130 is fluidically and electrically coupled to each of the anode conductor 110 and cathode conductor 150. During operation, the fuel is flown to the anode side of SOFC 102, while oxidant (e.g., air) is flown to the cathode side. Anode conductor 110 is a porous metal structure, which allows the fuel to pass through anode conductor 110 and reach electrolyte 130. Similarly, cathode conductor 150 is also a porous metal structure, which allows the oxidant to pass through cathode conductor 150 and to reach electrolyte 130. Electrolyte 130 is configured such the fuel and oxidant electrochemically react upon contacting electrolyte 130 and produce an electrical current between anode conductor 110 and cathode conductor 150. This electrical current is carried by interconnecting plate 106 to another SOFC 102 and/or external connectors.

FIGS. 2A and 2B also illustrate oxidant ports 192 extending through SOFC assembly 100 and each SOFC 102. More specifically, oxidant ports 192 extend anode conductor 110 and cathode conductor 150 of each SOFC 102. Therefore, both anode conductor 110 and cathode conductor 150 of each SOFC 102 are exposed to oxidant port 192. As noted above, anode conductor 110 is responsible for delivering the fuel to electrolyte 130. As such, without the flow control, the oxidant from oxidant port 192 can mix with the fuel, that is believed delivered by and is provided in anode conductor 110. While fuel port 190 is not shown in these cross-sectional views, one having ordinary skill in the art would understand that similar mixing can occur between the fuel (from fuel port 190) and the oxidant in cathode conductor 150. Direct fuel-oxidant mixing can lower the cell performance/power, reduce the overall efficiency, and cause localized fuel auto-ignition, all of which are not desirable.

While this disclosure focuses on sealing porous structures in SOFC 102, one having ordinary skill in the art would understand that this sealing approach can be used in any sealing structures, regardless of the application of these sealing structures.

Examples of Solid Oxide Fuel Cells with Porous Sealing

Figure 2C:
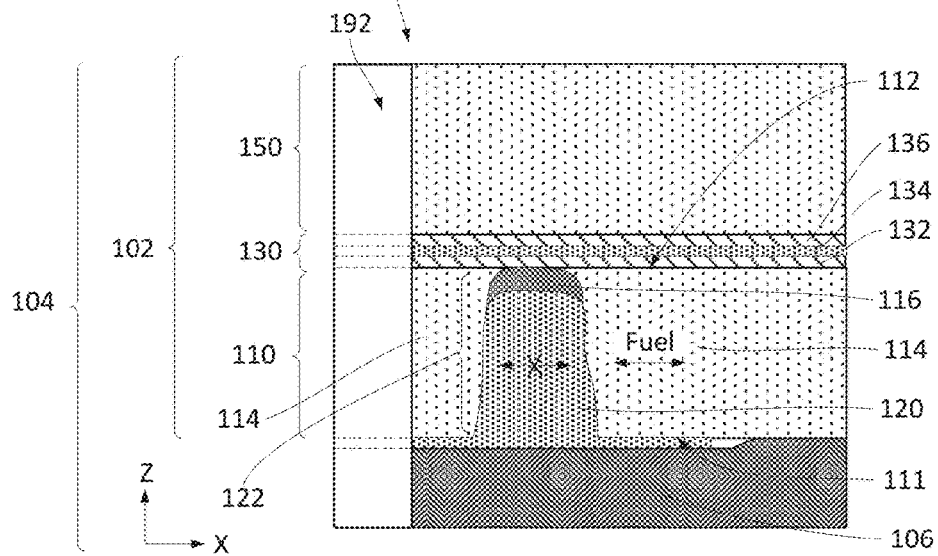
FIG. 2C is an expanded view of a portion of the SOFC assembly in FIG. 2B illustrating an anode-conductor sealing stack, extending through the anode conductor, in accordance with some examples.
Figure 2D:
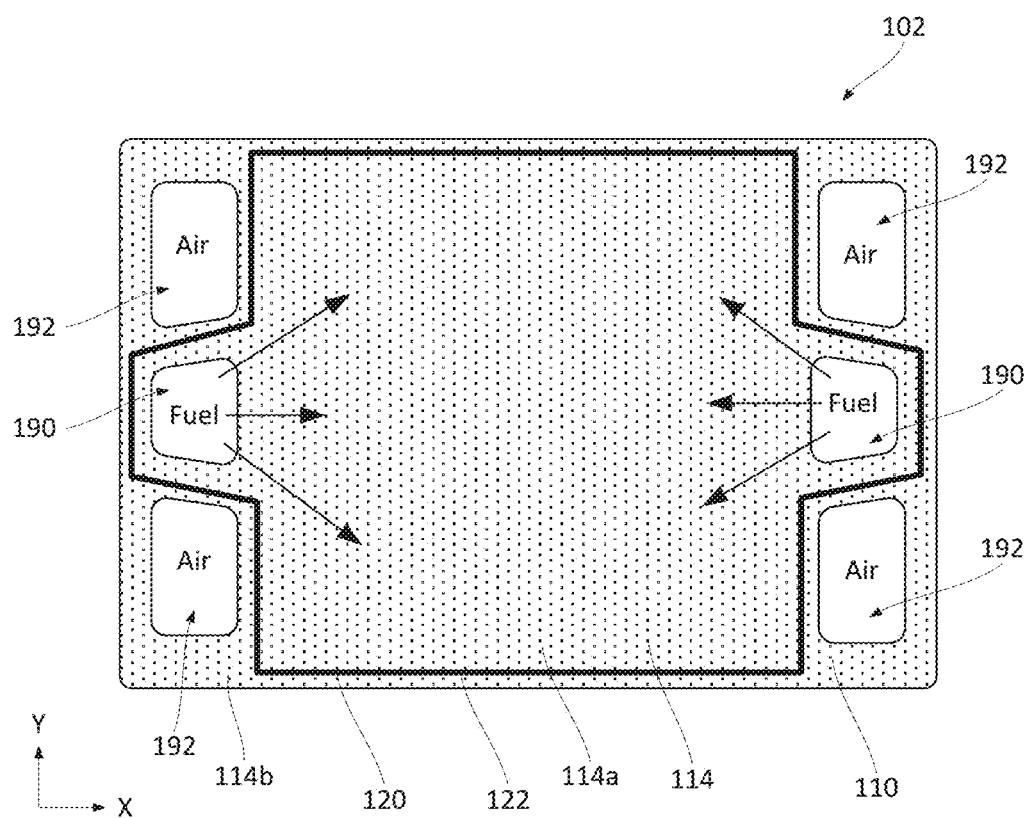
FIG. 2D is a top schematic view of the SOFC in the SOFC assembly (in FIGS. 2B and 2C) further illustrating the boundary formed by the anode-conductor sealing stack, in accordance with some examples.

Referring to FIGS. 2B-2D, fuel-oxidant mixing can be mitigated by positioning anode-conductor seal 120 within anode conductor 110. Furthermore, additional mitigation can be achieved by a cathode-conductor seal which is further described below with reference to FIGS. 3A and 3B. These anode-conductor and cathode-conductor seals are designed to fluidically isolate different zones of anode conductor 110 and cathode conductor 150. In some of these zones, the fuel is allowed while the oxidant is not allowed. In other zones, the oxidant is allowed while and the fuel is not allowed. Anode-conductor seal 120 will be now described with reference to FIGS. 2C and 2D.

Referring to FIG. 2C, anode conductor 110 comprises anode-conductor porous portions 114 and anode-conductor non-porous portion 116. In some examples, anode conductor 110 comprises multiple anode-conductor non-porous portions 116. Each of anode-conductor porous portions 114 is a porous structure that is permeable to the fuel. It should be noted that anode-conductor porous portions 114 are also permeable to the oxidant. However, at least one of anode-conductor porous portions 114 is protected to the oxidant and is used to supply fuel from fuel port 190 to electrolyte assembly 130. Another one of anode-conductor porous portions 114 can extend to oxidant port 192 and is fluidically isolated from the fuel-carrying portion. Anode-conductor non-porous portion 116 is positioned between these two types of anode-conductor porous portions 114.

Anode-conductor porous portions 114 is a metal porous structure, formed from stainless steel, such 430 stainless steel alloy, 434 stainless steel alloy, Fr—Cr alloys (e.g., with various additives), and the like. In some examples, the porosity of anode-conductor porous portions 114 is between 20% and 60% or, more specifically, between 30 and 55%. The electronic conduction and the material transfer are both impacted by the current collector porosity. In some examples, anode-conductor porous portions 114 comprise a sintering-control agent, such as doped zirconia ($X—ZrO_2$, wherein X can be yttrium (Y), scandium (Sc), cerium (Ce), and/or calcium (Ca)), alumina ($Al_2O_3$), yttria ($Y_2O_3$), calcium oxide (CaO), magnesium oxide (MgO). The amount of sintering-control agent can be between 0.1% by weight and 5% by weight or, more specifically, between 0.5% by weight and 2.5% by weight. The sintering-control agent helps to achieve finer metal grains, smaller pores, more uniform pore distribution, higher porosity. Overall, adding the sintering-control agent helps achieve higher flow rates of fuel, oxidant, and reaction products through the current collectors.

Anode-conductor non-porous portion 116 can be formed from a part of anode-conductor porous portion 114. In other words, an initial metal porous structure is selectively processed (e.g., compressed, melted) to form anode-conductor non-porous portion 116. The remaining unprocessed portions become anode-conductor porous portions 114. As such, in some examples, anode-conductor non-porous portion 116 is monolithic with anode-conductor porous portions 114 or at least formed from the same material. However, the porosity of anode-conductor non-porous portion 116 is substantially lower than that of anode-conductor porous portions 114. In some examples, anode-conductor non-porous portion 116 has a porosity of less than 10% or even less than 1%. This lower porosity ensures that anode-conductor non-porous portion 116 is impermeable to the fuel and oxidant.

Referring to FIG. 2C, anode-conductor non-porous portion 116 and anode-conductor seal 120 form sealing stack 122 that is impermeable to the fuel and the oxidant. In other words, each of anode-conductor non-porous portion 116 and anode-conductor seal 120 is impermeable to the fuel and the oxidant. Sealing stack 122 extends between two anode-conductor porous portions 114 and prevents the fuel and oxidant transfer between these portions.

Sealing stack 122 extends between electrolyte 130 and interconnecting plate 106. Sealing stack 122 is sealed against electrolyte 130, e.g., by the direct contact of anode-conductor non-porous portion 116 with electrolyte 130. Furthermore, sealing stack 122 is sealed against interconnecting plate 106 by the direct contact of anode-conductor seal 120 with interconnecting plate 106. It should be noted that neither electrolyte 130 nor interconnecting plate 106 are impermeable to the fuel and to the oxidant. Various examples of electrolyte 130 and interconnecting plate 106 will now be described.

As shown in FIG. 2C, electrolyte 130 comprises anode layer 132, cathode layer 136, and electrolyte layer 134 disposed between anode layer 132 and cathode layer 136. In some examples, each of anode layer 132 and cathode layer 136 comprises a porous base with catalysts sites disposed within this porous base. The porous base can comprise yttria-stabilized zirconia (YSZ), which is a ceramic comprising zirconium dioxide ($ZrO_2$) and yttrium oxide ($Y_2O_3$). Yttrium oxide helps to maintain zirconium dioxide in a cubic crystal structure over a wide temperature range. Other suitable additives in zirconia include, but are not limited to, scandium (Sc), ceria ($CeO_2$), and/or calcium. Other suitable materials for the porous base include, but are not limited to, ceria ($CeO_2$) dopes with gadolinium (Gd), samarium (Sm), lanthanum (La), calcium (La), and yttrium (Y). In some examples, the thickness of the porous base is anywhere from 5 micrometers to 40 micrometers or, more specifically, from 10 micrometers to 30 micrometers. The porosity of the porous base can be between 20% and 60% or, more specifically, between 30% and 50%. The pore size can be between 0.1 micrometers and 25 micrometers or, more specifically, between 0.5 micrometers and 20 micrometers. In some examples, the porous bases of anode layer 132 and cathode layer 136 have the same structure (e.g., the composition, thickness, and porosity).

In some examples, the cathode catalyst sites of cathode layer 136 comprise, but are not limited to, lanthanum strontium manganite (LSM with a general formula or $La_{1-x}Sr_xMnO_3$), praseodymium oxide (e.g., $Pr_2O_3$, $PrO_2$, $Pr_6O_{11}$). A lanthanum strontium cobalt ferrite (LSCF with a general formula $La_xSr_{1-x}Co_yFe_{1-y}O_3$), and/or lanthanum strontium cobaltite (LSC, e.g., $LaSrCoO_3$). The material of the cathode catalyst sites is specifically selected to provide oxidant reduction. Furthermore, the cathode catalyst sites are at least partially responsible for the electronic conduction within cathode layer 136. For example, LSM has a high electrical conductivity at higher temperatures (e.g., between about 100 S/cm and 500 S/cm at a temperature of 600° C. and 1000° C.). Furthermore, LSM does not react with YSZ, which helps with extending the operating lifetime of SOFC 102. However, the ionic conductivity of LSM is low, which limits the activity of the cathode catalyst sites (e.g., to a triple-phase boundary). In some examples, a combination of LSM and YSZ is used as cathode catalyst sites to increase the size of this triple-phase boundary. In the same or other examples, the catalyst sites of anode layer 132 comprise nickel. The material of the anode catalyst sites is specifically selected to stimulate electrochemical fuel oxidation. Furthermore, the anode catalyst sites are at least partially responsible for the electronic conduction within anode layer 132.

In some examples, electrolyte layer 134 is formed from ZrO and/or CeO, e.g., doped with one or more of Sm, Y, Sc, Gd, Al, and/or La. The porosity of electrolyte layer 134 is less than 5% or even less than 1%.

In some examples, interconnecting plate 106 comprises are formed from stainless steel or other suitable materials. A portion of interconnecting plate 106 can have out-of-plane protrusions to form better direct mechanical and electrical contacts with adjacent SOFCs 102 or, more specifically, with anode conductor 110 of one SOFC 102 and with cathode conductor 150 of another SOFC 102. For example, out-of-plane protrusions can have a wave profile as, e.g., is schematically shown in FIGS. 2A and 2B.

Referring to FIG. 2C, anode conductor 110 comprises anode-conductor first side 111 and anode-conductor second side 112. Anode-conductor second side 112 is opposite of anode-conductor first side 111 and directly interfaces electrolyte 130 or, more specifically, anode layer 132 of electrolyte 130. Anode-conductor first side 111 is formed entirely by anode-conductor porous portions 114. Anode-conductor second side 112 is formed by both anode-conductor porous portions 114 and anode-conductor non-porous portions 116.

In some examples, a portion of anode-conductor seal 120 extends over anode-conductor first side 111. This portion provides additional sealing around anode-conductor sealing stack 122 and helps with sealing against corresponding interconnecting plate 106. It should be noted that this portion of anode-conductor seal 120 extends over a small portion of anode-conductor first side 111, while the remaining portion anode-conductor first side 111 is free from anode-conductor seal 120 and forms a direct mechanical and electrical contact with interconnecting plate 106. In some examples, the size of the portion of anode-conductor first side 111 covered with conductor seal 120 is between 0.5% and 10% or, more specifically, between 1% and 5% of the total surface of anode-conductor first side 111.

Referring to FIG. 2C, in some examples, the height of anode-conductor seal 120 is greater than the height of anode-conductor non-porous portion 116 in anode-conductor sealing stack 122. In general, anode-conductor seal 120 covers between 20% and 80% or, more specifically, between 30% and 70% of the total height of anode-conductor sealing stack 122. These height proportions depend on the porosity of anode-conductor porous portion 114 and also on the porosity of anode-conductor non-porous portions 116. For example, anode-conductor non-porous portions 116 can be formed by condensing (e.g., compressing, melting) a part of the continuous porous structure, the remaining parts of which become anode-conductor porous portions 114. Various porosity examples are described above.

Referring to FIG. 2C, in some examples, anode-conductor non-porous portion 116 extends to and directly interfaces electrolyte 130. Therefore, anode-conductor non-porous portion 116 forms a portion of the overall seal at the interface with electrolyte 130. The position of anode-conductor non-porous portion 116 in anode-conductor sealing stack 122 is determined by the order of manufacturing operations. For example, anode-conductor non-porous portion 116 can be formed from a continuous porous structure after this structure has been stacked with electrolyte 130. In other words, electrolyte 130 already interfaces anode-conductor second side 112, prior to forming anode-conductor non-porous portion 116. However, anode-conductor first side 111 is exposed and available for processing. As further described with reference to FIG. 4, a cavity is formed in anode-conductor first side 111 by selectively melting or compressing a portion of this continuous porous structure. Anode-conductor non-porous portion 116 is positioned under this cavity. Anode-conductor seal 120 is later formed in this cavity.

Referring to FIGS. 2B and 2C, in some examples, at least a portion of anode-conductor porous portions 114 of anode conductor 110 directly interfaces and is electrically coupled to the first one of interconnecting plates 106. Similarly, at least a portion of cathode-conductor porous portions 154 of cathode conductor 150 directly interfaces and is electrically coupled to the second one of interconnecting plates 106. As described above, interconnecting plates 106 can have various out-of-plate features to enhance and maintain this electrical coupling. In some examples, anode-conductor seal 120 extends to and is sealed against the first one of interconnecting plates 106.

Referring to FIG. 2D, in some examples, anode-conductor seal 120 or, more specifically, anode-conductor sealing stack 122 (formed by anode-conductor seal 120 and anode-conductor non-porous portion 116) forms a boundary around one of anode-conductor non-porous portions 116. This boundary may be referred to as an anode-conductor boundary to differentiate from a cathode-conductor boundary. Specifically, FIG. 2D is a planar schematic view of one side of SOFC 102 showing anode conductor 110. Cathode conductor 150 is positioned below and is not visible in FIG. 2D. Anode conductor 110 comprises anode-conductor porous portions 114, such as first anode-conductor porous portion 114a and second anode-conductor porous portion 114b. First anode-conductor porous portion 114a is surrounded by anode-conductor sealing stack 122, formed by anode-conductor seal 120 and anode-conductor non-porous portion 116. First anode-conductor porous portion 114a is fluidically coupled to fuel ports 190. The fuel is received (from fuel ports 190) and distributed by first anode-conductor porous portion 114a. However, the fuel is restricted to first anode-conductor porous portion 114a and cannot pass through anode-conductor sealing stack 122. As such, second anode-conductor porous portion 114b, being fluidically isolated from first anode-conductor porous portion 114a, can be exposed to the oxidant without risk of direct fuel-oxidant mixing. Furthermore, the fuel is not able to reach the edges of SOFC 102 and leak into the rest other parts of SOFC assembly 100 or the environment. As shown in FIG. 2D, second anode-conductor porous portion 114b surround oxidant ports 192. This configuration of anode-conductor sealing stack 122 simplifies manufacturing of anode-conductor sealing stack 122 and provides new routing options for the fuel and oxidant.

Figure 3A:
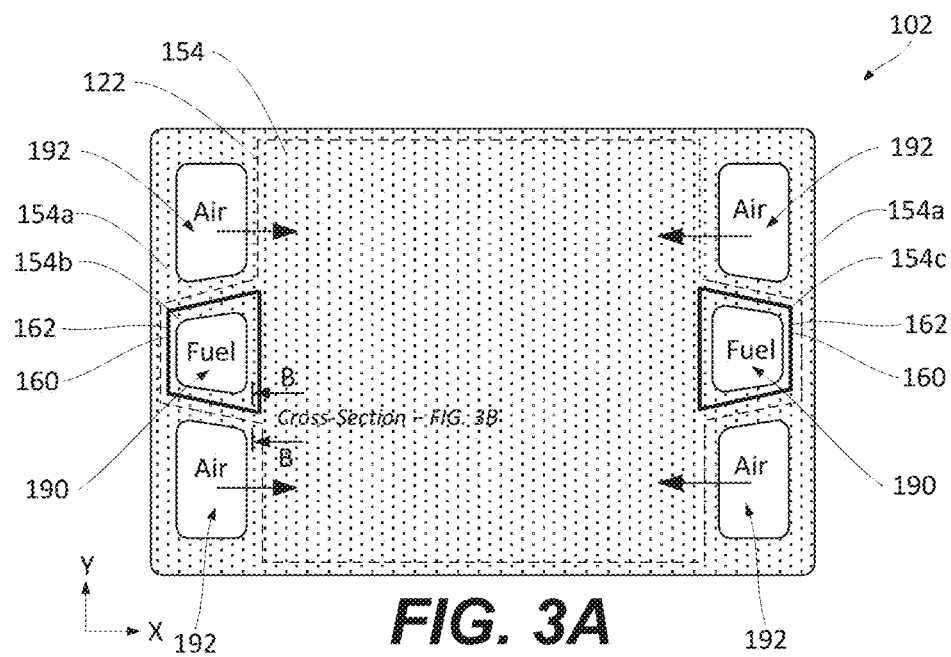
FIG. 3A is a top schematic view expanded view of the cathode conductor of a SOFC, in accordance with some examples.
Figure 3B:
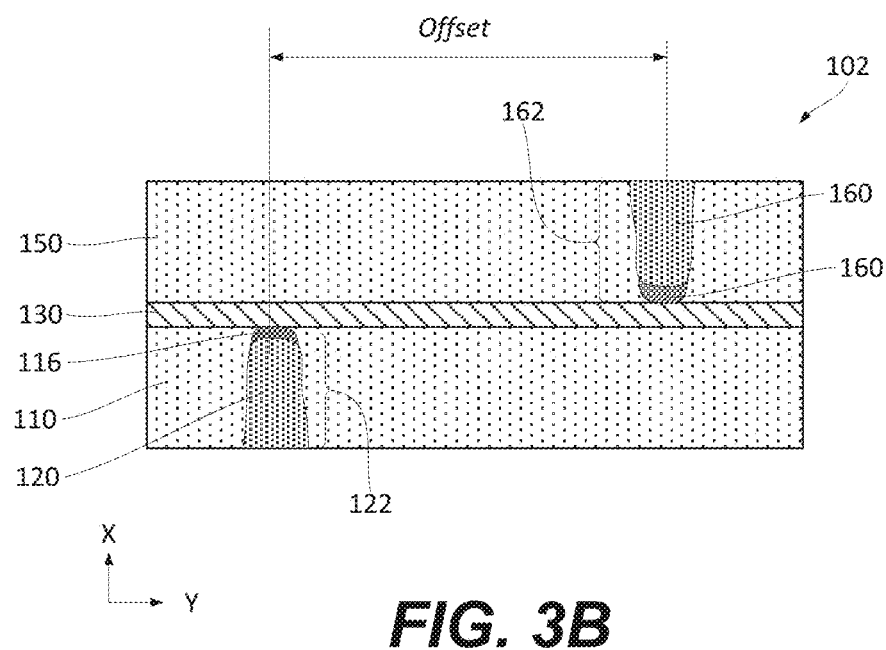
FIG. 3B is a side cross-sectional view of the SOFC active component comprising the anode conductor, illustrated in FIG. 3A, and the cathode conductor, illustrated in FIG. 3B, in accordance with some examples.

Referring to FIGS. 3A and 3B, in some examples, SOFC 102 further comprising cathode-conductor seal 160. Specifically, cathode conductor 150 comprises cathode-conductor non-porous portion 156. Cathode-conductor non-porous portion 156 and cathode-conductor seal 160 form cathode-conductor sealing stack 162 that is impermeable to the fuel and/or the air. Various aspects of anode-conductor seal 120, described above, apply to cathode-conductor seal 160. Specifically, FIG. 3A is a planar schematic view of one side of SOFC 102 showing cathode conductor 150 is (opposite to the side shown in FIG. 2D). In this view, anode conductor 110 is positioned below and is not visible. Specifically, cathode conductor 150 comprises cathode-conductor porous portions 154, such as first cathode-conductor porous portion 154a, second cathode-conductor porous portion 154b, and third cathode-conductor porous portion 154c. Each of second cathode-conductor porous portion 154b and third cathode-conductor porous portion 154c is surrounded by cathode-conductor sealing stack 162, formed by cathode-conductor seal 160 and cathode-conductor non-porous portion 156. As such, first cathode-conductor porous portion 154a is fluidically isolated from each of second cathode-conductor porous portion 154b and third cathode-conductor porous portion 154c. First cathode-conductor porous portion 154a is fluidically coupled to oxidant ports 192. The oxidant is received (from oxidant ports 192) and distributed by first cathode-conductor porous portion 154a. However, the oxidant is restricted from going to second cathode-conductor porous portion 154b and third cathode-conductor porous portion 154c. As such second cathode-conductor porous portion 154b and third cathode-conductor porous portion 154c, being fluidically isolated from first cathode-conductor porous portion 154a, can be exposed to the fuel without risk of direct fuel-oxidant mixing. As shown in FIG. 3A, each second cathode-conductor porous portion 154b and third cathode-conductor porous portion 154c surrounds one of fuel ports 190.

Referring to FIG. 3B, in some examples, cathode-conductor seal 160 is laterally offset relative to anode-conductor seal 120. This offset helps to preserve the overall integrity of SOFC 102 and provide support to electrolyte 130. Specifically, electrolyte 130 is much thinner than each of anode conductor 110 and cathode conductor 150. Anode conductor 110 and cathode conductor 150 provide mechanical primary mechanical support to the overall SOFC 102. When cathode-conductor seal 160 protrudes through cathode conductor 150, cathode conductor 150 is weakened at this point. Similarly, when anode-conductor seal 120 protrudes through anode conductor 110, anode conductor 110 is weakened at this point. The offset between cathode-conductor seal 160 and anode-conductor seal 120 helps to space apart these weakened portions.

In some examples, the offset between cathode-conductor seal 160 and anode-conductor seal 120 is at least 1 millimeter or, more specifically, at least 2 millimeters. For comparison, the thickness of each anode conductor 110 and cathode conductor 150 is between 5 micrometers and 100 micrometers or, more specifically, between about 10 micrometers and 50 micrometers. The thickness of electrolyte 130 is between 5 micrometers and 100 micrometers or, more specifically, between about 10 micrometers and 50 micrometers.

Examples of Methods of Forming Solid Oxide Fuel Cell Stacks

Figure 4:
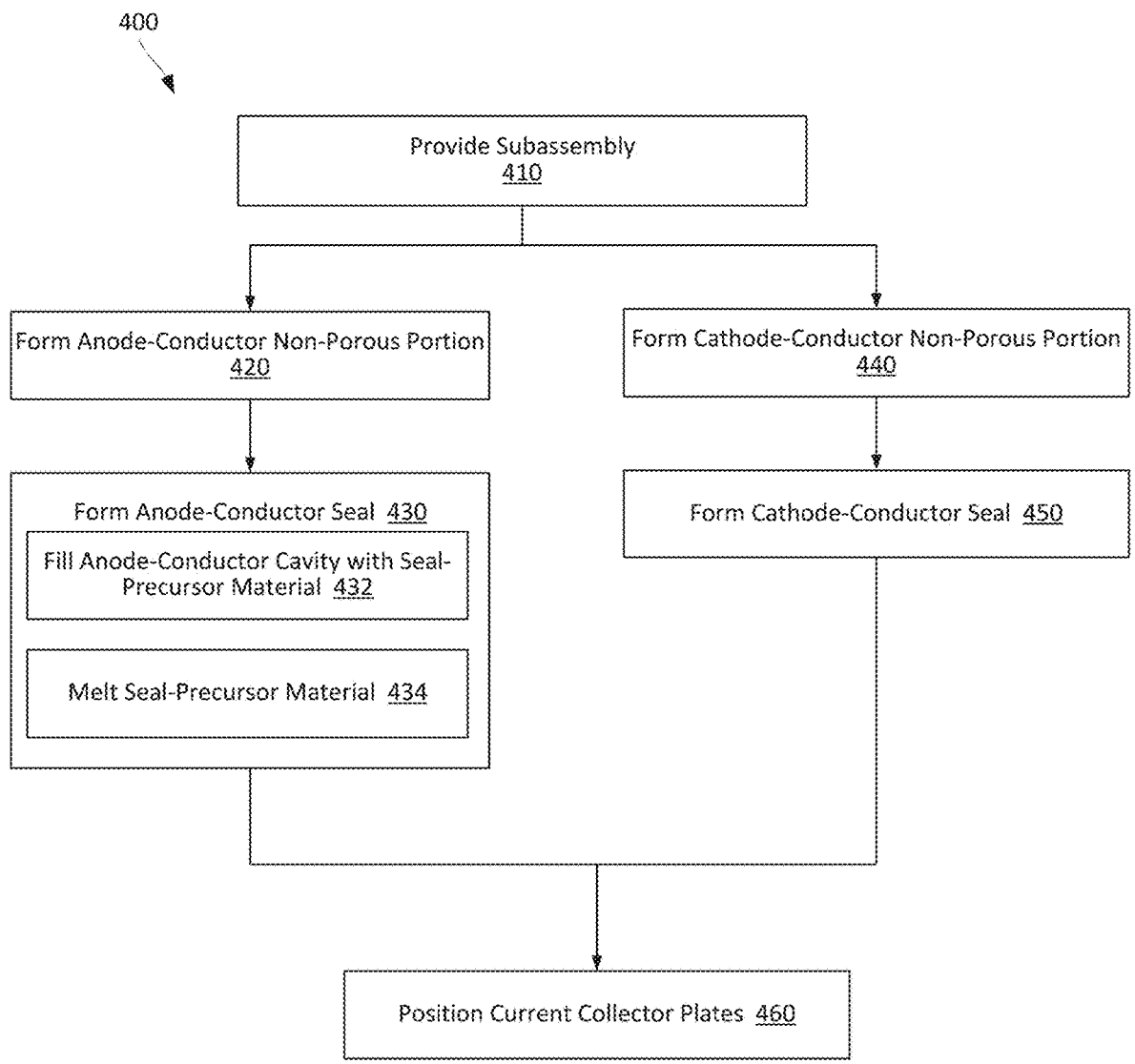
FIG. 4 is a process flowchart corresponding to a method of forming a SOFC, in accordance with some examples.

FIG. 4 is a process flowchart corresponding to method 400 of forming SOFC 102, in accordance with some examples. Various examples of SOFC 102 are described below. SOFC 102 comprises anode conductor 110, cathode conductor 150, and electrolyte assembly 130 positioned between anode conductor 110 and cathode conductor 150. Furthermore, SOFC 102 comprises one or more anode-conductor seals 120 and/or one or more cathode-conductor seals 160, used for controlling the flow of fuel and oxidant within anode conductor 110 and cathode conductor 150.

Figure 5A:
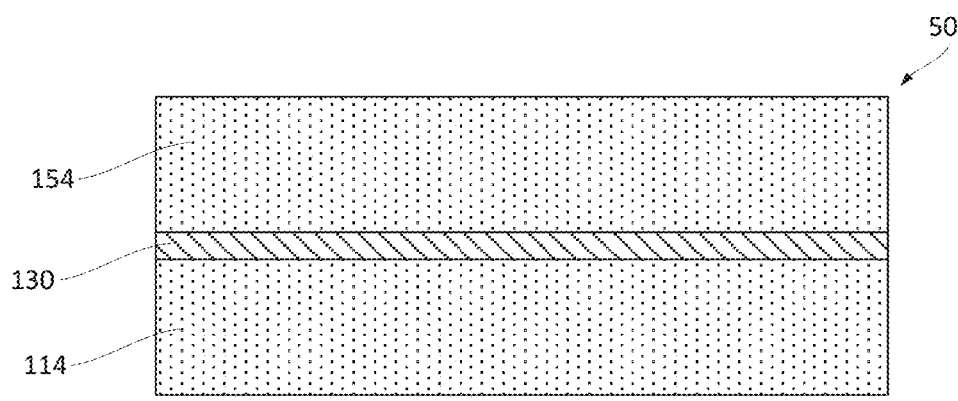
FIGS. 5A-5E are schematic cross-sectional views of different stages during the method of forming the SOFC in FIG. 4.

Method 400 comprises (block 410) providing subassembly 500 comprising anode-conductor porous portion 114, cathode-conductor porous portion 154, and electrolyte 130. Electrolyte 130 is disposed between anode-conductor porous portion 114 and cathode-conductor porous portion 154 as, e.g., schematically shown in FIG. 5A. At this stage, each of anode-conductor porous portion 114 and cathode-conductor porous portion 154 is a continuous porous structure. During later operations, one or more selected parts of anode-conductor porous portion 114 are converted into anode-conductor non-porous portions 116. These anode-conductor non-porous portions 116 separate remaining anode-conductor porous portions 114. Similarly, one or more selected parts of cathode-conductor porous portion 154 can be converted into cathode-conductor non-porous portions 156. These cathode-conductor non-porous portions 156 separate remaining cathode-conductor porous portions 154.

Figure 5B:
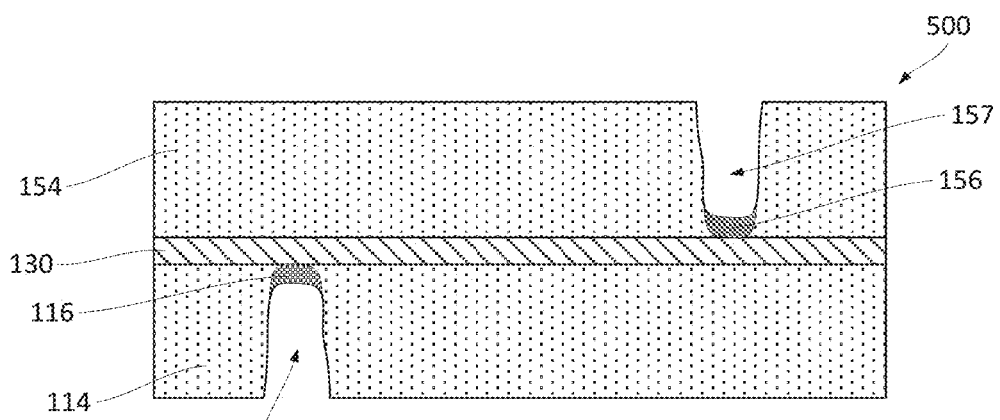

Method 400 proceeds with (block 420) forming one or more anode-conductor non-porous portions 116 from selected parts of anode-conductor porous portion 114. Forming anode-conductor non-porous portions 116 also forms anode-conductor cavity 117 as, e.g., is schematically shown in FIG. 5B. For example, anode-conductor non-porous portions 116 can be formed using one or more techniques selected from the group: (1) selective mechanical compression of the part of anode-conductor porous portion 114 and (2) selective melting of the part of anode-conductor porous portion 114. The location of anode-conductor non-porous portions 116 is described above with reference to FIG. 1B.

In some examples, method 400 also comprises (block 440) forming one or more cathode-conductor non-porous portions 156 from selected parts of cathode-conductor porous portion 154. Forming cathode-conductor non-porous portions 156 also forms cathode-conductor cavity 157 as, e.g., is schematically shown in FIG. 5B. For example, cathode-conductor non-porous portions 156 can be formed using one or more techniques described above with reference to forming anode-conductor non-porous portions 116. In some examples, anode-conductor non-porous portions 116 and cathode-conductor non-porous portions 156 are formed in the same operation or even simultaneously. When both anode-conductor non-porous portions 116 and cathode-conductor non-porous portions 156 are formed in the same subassembly 500, two adjacent ones of adjacent anode-conductor non-porous portion 116 and cathode-conductor non-porous portion 156 are offset relative to each other as described above with reference to FIG. 3B.

Figure 5C:
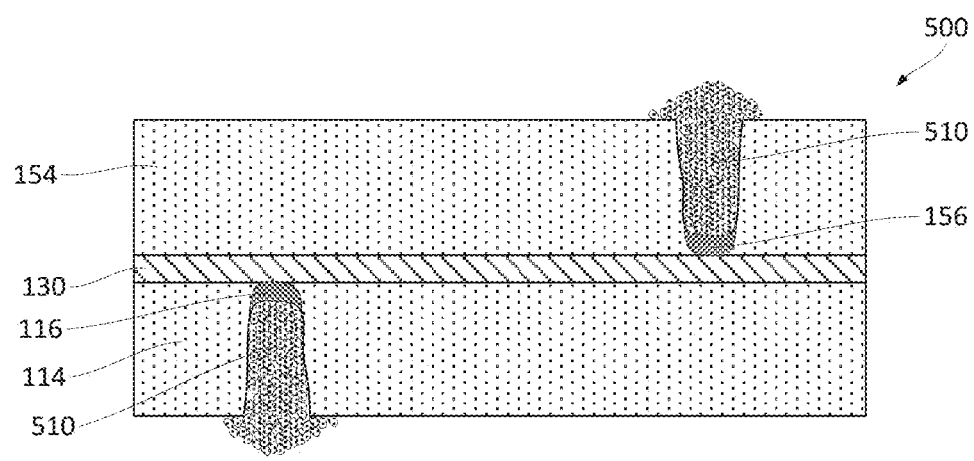
Figure 5D:
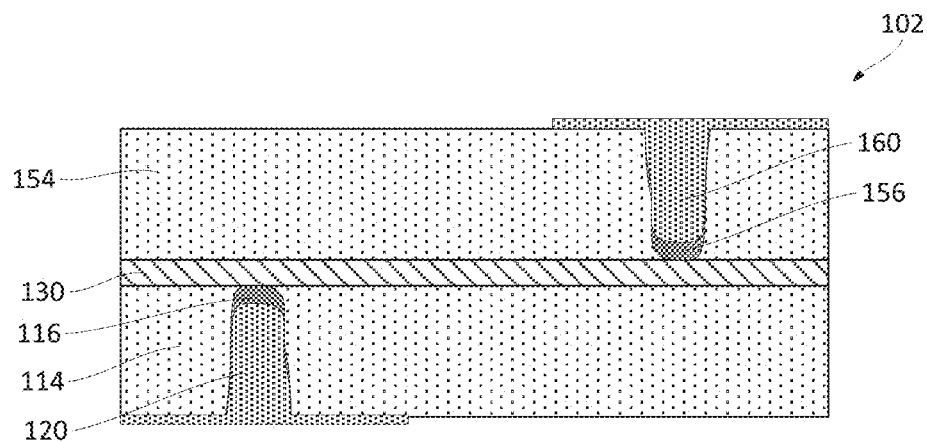
Figure 5E:
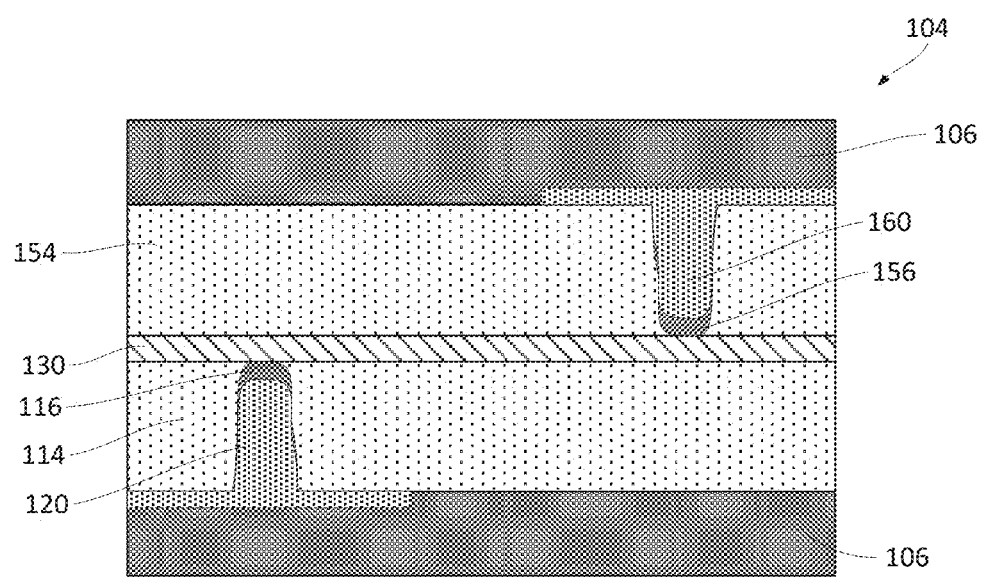

Method 400 proceeds with (block 430) forming anode-conductor seal 120 within anode-conductor cavity 117. For example, this anode-conductor seal forming operation comprises (block 432) filling anode-conductor cavity 117 with seal-precursor material 510 as, e.g., is schematically shown in FIG. 5C, and (block 434) melting seal-precursor material 510 within anode-conductor cavity 117 as, e.g., is schematically shown in FIG. 5D. Various examples of anode-conductor seal 120 are described above. In some examples, melting seal-precursor material 510 within anode-conductor cavity 117 can be performed during the overall processing (e.g., sintering) of SOFC assembly 100.

In some examples, method 400 proceeds with (block 450) forming cathode-conductor seal 160. In these examples, cathode-conductor seal 160 can be formed in a manner similar to forming anode-conductor seal 120. In more specific examples, cathode-conductor seal 160 and anode-conductor seal 120 can be formed in the same operation.

In some examples, method 400 proceeds with (block 460) with positioning interconnecting plates 106 on the opposite sides of SOFC 102. One interconnecting plate 106 can come in direct mechanical and electrical contact with anode-conductor porous portion 114 and also sealed against anode-conductor seal 120. The other interconnecting plate 106 can come in direct mechanical and electrical contact with cathode-conductor porous portion 154 and also sealed against cathode-conductor seal 160. In some examples, interconnecting plates 106 are positioned prior to melting the seal-precursor material (block 534) and are used to support the seal-precursor material within corresponding cavities.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered illustrative and not restrictive.

What is claimed is:

1. A solid oxide fuel cell for electrochemically reacting fuel and oxidant and producing an electrical current, the solid oxide fuel cell comprising:
   an anode conductor, comprising anode-conductor porous portions and an anode-conductor non-porous portion, wherein each of the anode-conductor porous portions is permeable to the fuel;
   an anode-conductor seal, wherein the anode-conductor non-porous portion and the anode-conductor seal form a stack, impermeable to the fuel and forming an anode-conductor boundary around one of the anode-conductor porous portions;
   a cathode conductor, comprising a cathode-conductor porous portion permeable to the oxidant and a cathode-conductor non-porous portion;
   a cathode-conductor seal;
   an electrolyte, disposed between the anode conductor and cathode conductor, wherein:
      the electrolyte is fluidically and electrically coupled to each of the anode conductor and the cathode conductor, and
      the electrolyte is configured to electrochemically react the fuel and the oxidant to produce the electrical current between the anode conductor and cathode conductor; and
   interconnecting plates having out-of-plane protrusions, wherein:
      the out-of-plane protrusions have a wave profile,
      at least a part of the anode-conductor porous portions of the anode conductor directly interfaces and is electrically coupled to a first one of the interconnecting plates,
      at least a part of the cathode-conductor porous portions of the cathode conductor directly interfaces and is electrically coupled to a second one of the interconnecting plates,
      the anode-conductor seal extends to and is sealed against the first one of the interconnecting plates, and
      the cathode-conductor seal is laterally offset relative to the anode-conductor seal by a distance greater than a thickness of the anode-conductor.

2. The solid oxide fuel cell of claim 1, wherein the anode-conductor non-porous portion is monolithic with the anode-conductor porous portions.

3. The solid oxide fuel cell of claim 1, wherein the anode-conductor non-porous portion and the anode-conductor porous portions are both formed stainless steel.

4. The solid oxide fuel cell of claim 1, wherein the anode-conductor non-porous portion has a porosity of less than 10%.

5. The solid oxide fuel cell of claim 1, wherein the anode-conductor non-porous portion is formed by compression or melting of the anode-conductor porous portions.

6. The solid oxide fuel cell of claim 1, wherein the anode-conductor seal is formed from one or more materials selected glass or braze.

7. The solid oxide fuel cell of claim 1, wherein:
the anode conductor comprises an anode-conductor first side and an anode-conductor second side, opposite of the anode-conductor first side and directly interfacing the electrolyte, and
a portion of the anode-conductor seal extends over a part of the anode-conductor first side.

8. The solid oxide fuel cell of claim 1, wherein a height of the anode-conductor seal is greater than the height of the anode-conductor non-porous portion in the stack.

9. The solid oxide fuel cell of claim 1, wherein the anode-conductor non-porous portion extends to and directly interfaces the electrolyte.

10. The solid oxide fuel cell of claim 1, further comprising interconnecting plates, wherein:
at least a part of the anode-conductor porous portions of the anode conductor directly interfaces and is electrically coupled to a first one of the interconnecting plates,
at least a part of the cathode-conductor porous portions of the cathode conductor directly interfaces and is electrically coupled to a second one of the interconnecting plates, and
the anode-conductor seal extends to and is sealed against the first one of the interconnecting plates.

11. The solid oxide fuel cell of claim 10, wherein at least a part of the anode-conductor seal extends between the first one of the interconnecting plates and the anode-conductor porous portions.

12. The solid oxide fuel cell of claim 1, wherein
the cathode-conductor non-porous portion and the cathode-conductor seal form a cathode-conductor sealing stack impermeable to the fuel and forming a cathode-conductor boundary around at least a part of the cathode-conductor porous portion.

13. The solid oxide fuel cell of claim 12, wherein the cathode-conductor boundary is surrounded by the anode-conductor boundary.

14. The solid oxide fuel cell of claim 12, wherein the cathode-conductor boundary surrounds a fuel port, protruding through the solid oxide fuel cell.

15. The solid oxide fuel cell of claim 7, wherein a size of the part of the anode-conductor first side covered by the anode-conductor seal is less than 5% of a total surface of the anode-conductor first side.

16. The solid oxide fuel cell of claim 1, wherein the anode-conductor porous portions comprise a sintering-control agent selected from the group consisting of doped zirconia, alumina ($Al_2O_3$), yttria ($Y_2O_3$), calcium oxide (CaO), and magnesium oxide (MgO).

17. The solid oxide fuel cell of claim 16, wherein the anode-conductor porous portions comprise 0.1%-5% by weight of the sintering-control agent.

18. The solid oxide fuel cell of claim 1, wherein the anode conductor has a thickness of 5-100 micrometers.

19. The solid oxide fuel cell of claim 11, wherein the interconnecting plates comprise stainless steel.

20. The solid oxide fuel cell of claim 1, wherein the thickness of the electrolyte is between 10-50 micrometers.

* * * * *